United States Patent [19]
Morrell et al.
[11] 3,838,229
[45] Sept. 24, 1974

[54] TELEPHONE SETS AND REMOVABLE COVERS THEREFORE

[75] Inventors: Ronald Joseph Morrell; Bev William Gumb; Graham Sterling Laing; Frederick Thomas Cogan, all of London, Ontario, Canada

[73] Assignee: Bell-Northern Research Ltd., Ottawa, Ontario, Canada

[22] Filed: Apr. 16, 1973

[21] Appl. No.: 351,468

[52] U.S. Cl. .............................. 179/100 D, 179/179
[51] Int. Cl. .......................... H04m 1/02, H04m 1/23
[58] Field of Search ............ 179/100 R, 100 D, 178, 179/179, 184; D26/14 A; 40/336; 292/87, DIG. 38

[56] References Cited

UNITED STATES PATENTS

| | | | |
|---|---|---|---|
| 3,339,960 | 9/1967 | Gee | 179/178 |
| 3,345,769 | 10/1967 | Nathan | 179/178 |
| 3,435,160 | 3/1969 | Hartz et al. | 179/100 D |
| 3,444,329 | 5/1969 | Krumreich | 179/100 R |
| 3,480,743 | 11/1969 | Engh et al. | 179/178 |
| 3,491,221 | 1/1970 | Zamarra | 179/178 |
| 3,553,875 | 1/1971 | Hicks | 40/336 |
| 3,657,487 | 4/1972 | Schwanck et al. | 179/179 |

FOREIGN PATENTS OR APPLICATIONS

| | | | |
|---|---|---|---|
| 220,684 | 11/1959 | Austria | 179/179 |

*Primary Examiner*—Kathleen H. Claffy
*Assistant Examiner*—Randall P. Myers
*Attorney, Agent, or Firm*—Sidney T. Jelly

[57] ABSTRACT

A removable cover for a telephone unit, which clips into place and is quickly and easily removed by service personnel. A variety of dial forms and other aperture arrangements can be accommodated merely by changing the cover. The main unit housing can be formed to accept all dial and other variations so that a single unit suffices for all variations. This reduces stock holdings and is more economic. Colour variation is also readily provided.

4 Claims, 4 Drawing Figures

TELEPHONE SETS AND REMOVABLE COVERS THEREFORE

This invention relates to telephone sets, particularly desk and wall mounted sets as are used in offices and houses, and to removable covers for such sets.

It is normal to form a telephone set by fastening together top and bottom housings to form an enclosure, within which are mounted various items such as circuits, bells and other items. A dial is mounted in an aperture in the top housing, and various other apertures may be provided for various items.

A feature of present day telephones is the provision of either a rotary or pushbutton dial. Depending on the dial provided the aperture required differs. Also, depending upon the different services to be provided so differing aperture layouts are required. Conventional top housings are bulky, relatively expensive and it represents a considerable cost to stock such housings with all the differing forms of apertures which may be required. The provision of colour options further multiplies the number of different housings to be stocked.

The present invention provides a readily removable and replaceable cover which clips into positon over the top housing, being held firmly and securely in place. The cover is provided with the variation in aperture layout and also colour variations. The cover is considerably less bulky, and less expensive than the top housing, and is easier and quicker to remove and replace. The cover can extend over only part of the top housing or can extend over all the top surface of the housing. Although easily removed and replaced, the cover is not easily removed accidently, as when handling the telephone set.

It is possible to provide some access to the enclosure of the telephone set by providing apertures in the top housing, these apertures covered by the cover when in place.

In its broadest aspect a cover has substantially rigid projections on one edge for engagement below a surface of the telephone set and a resilient projection on an opposed edge for engagement below a further surface on the telephone set. An aperture is provided in the telephone set at a position opposed to the resilient projection for insertion of a probe, the probe pressing on the resilient projection to urge it out of engagement with the surface on the telephone set.

In particular, the cover extends for only part of the telephone set, the rest for the handset formed on a separate member not removeable with the cover.

The invention will be readily understood by the following description of an embodiment, by way of example, in conjunction with the accompanying drawings, in which.

Figure 1:
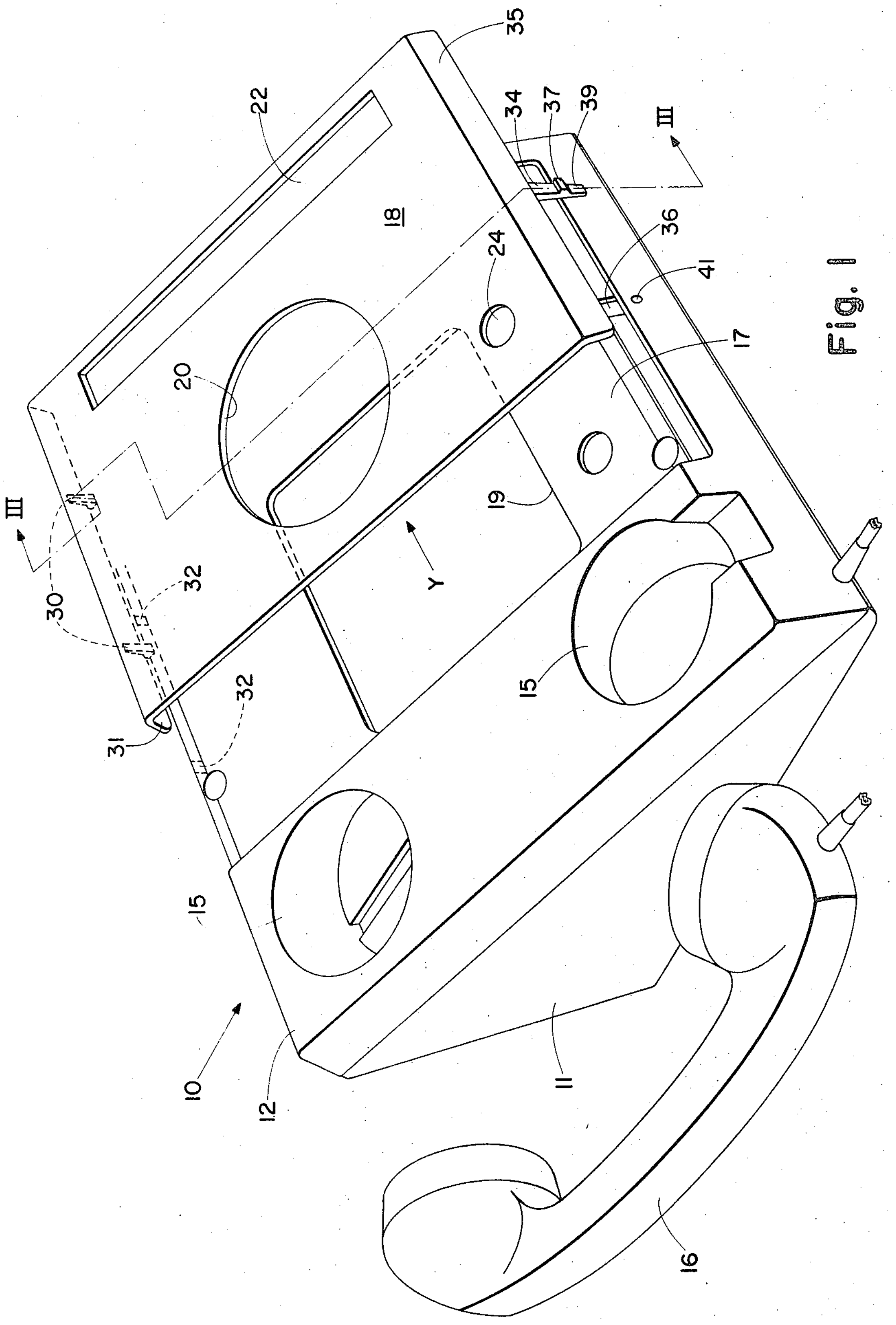
FIG. 1 is a perspective view of a telephone set, with the cover shown displaced for clarity.
Figures 2, 3, 4:
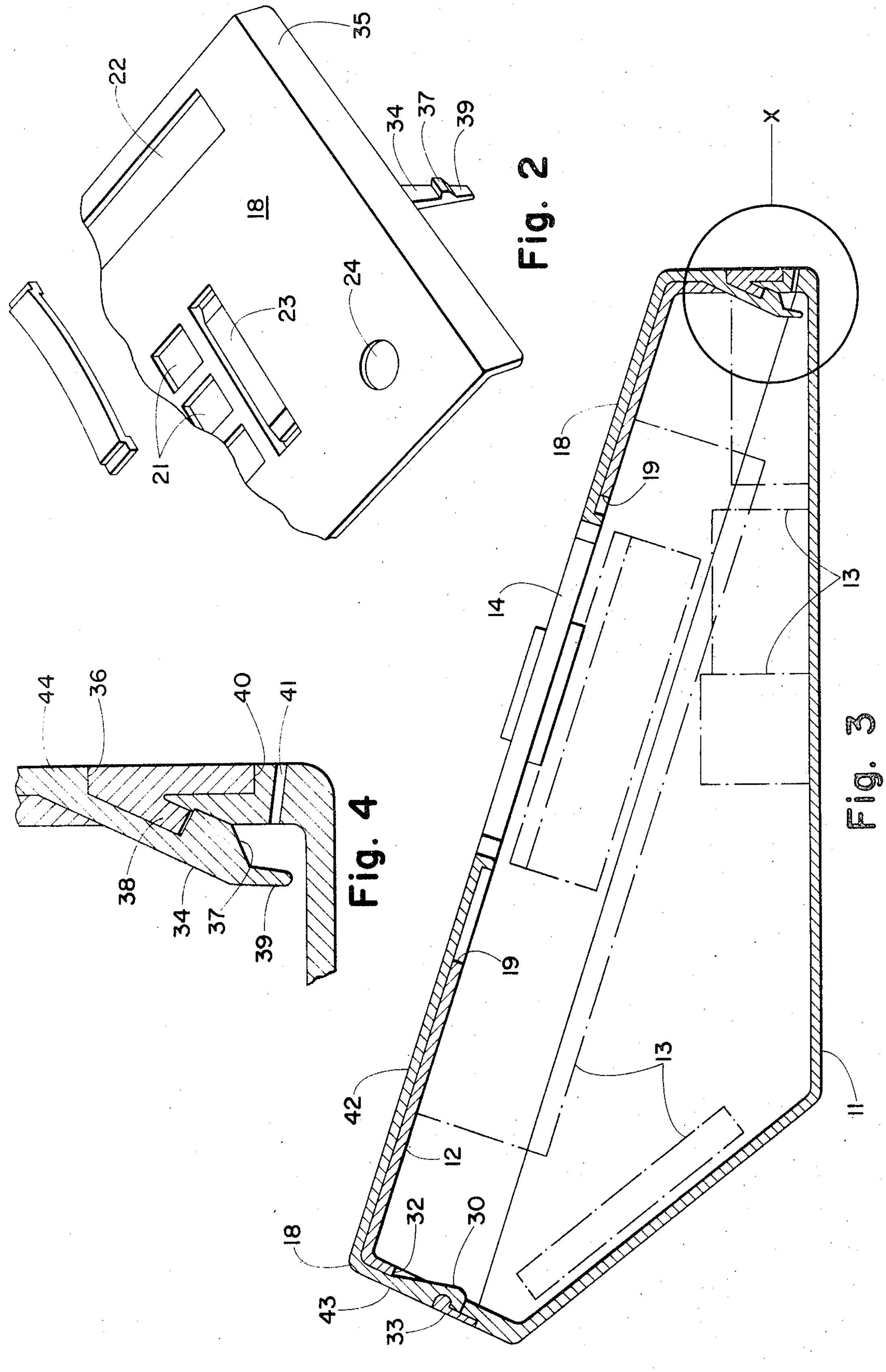
FIG. 2 is a partial perspective view of an alternative cover.
FIG. 3 is a cross-section through a telephone set, as in FIG. 1, illustrating the positioning and form of cover retaining projections.
FIG. 4 is an enlarged view of the detail in the circle X in FIG. 3.

As seen in FIGS. 1 and 3, a telephone set 10 comprises a base housing 11 and a top housing 12. Base and top housings 11 and 12 form an enclosure within which are mounted the various items, such as circuitry, bell and other details. Some of these items are indicated generally in FIG. 3 by chain dotted lines 13. These items are not included in FIG. 1, for clarity, the dial also omitted in FIG. 1 but indicated at 14 in FIG. 3.

The top housing 12 includes two recesses 15 toward one side for reception of the handset 16. The remainder of the top housing is largely taken up by a recessed portion 17. This recessed portion is intended to receive a removeable cover 18. In the example illustrated the recessed portion 17 has formed therein an aperture 19 for the dial. This aperture is of a shape and size to accept whatever form of dial, rotary or pushbutton for example, which may be fitted to the telephone set. As a modification, the aperture can be large enough to permit access to the interior of the telephone set.

The removeable cover 18 is provided with an aperture or apertures which conform fairly closely to the form of dial being used. Thus as seen in FIG. 1 the cover 18 has a circular aperture 20 to suit a rotary dial 14 (FIG. 3). In an alternative form of cover for use with a pushbutton dial, as illustrated in FIG. 2, a series of apertures 21 are provided, an aperture for each button. Further apertures can also be provided. Thus as seen in both FIGS. 1 and 2 an elongate aperture 22 is provided through which extend pushbuttons as provided for a button-key telephone set used in offices and similar situations. FIG. 2 also shows a further aperture 23 beneath the apertures 21, for a further pushbutton or for an insert (for example extensions or station identification numbers) and aperture 24 can be provided for a rotary switch (not shown).

The removeable cover 18 is held firmly and closely in place, yet is readily removeable. In the example illustrated, the cover 18 is provided with two hook-shaped projections 30. The projections 30 are on the inside of the cover at the top edge and extend through apertures 32 in the top housing 12. The hook portions of the projections engage under a rim 33 on the inside of the top housing 12. Also provided is a flexible projection 34 extending downwardly on the inside of the front in the top housing 12 and extending through an opening or aperture 36. Projection 34 has a hooked portion 37 which fits under a short projecting flange 38 on the inside of the top housing 12. The projection 34 also has an extension 39 which projects down below the joint line 40 between base and top housings 11 and 12. A small hole 41 is formed in the front of the base housing positioned so as to be aligned with the projection 34 when the cover 18 is in position.

The removeable cover is placed in position by first positioning the upper end over the top of the top housing, the projections 30 passing through apertures 32. The lower end of the cover 18 is lowered and the projection 34 passed through aperture 36 and then, as cover 18 is pressed down, the projection 34 flexes and the hooked portion 37 slides down the short flange 38 and clips under the edge of the flange. Cover 18 is then held firmly in place. The cover 18 can readily be removed by inserting a spike or probe through the small hole 41. A normal tool provided in a telephone maintenance kit is a small probe and this is used. The probe is pushed against the extension 39 of the projection 34 and the projection is flexed to release the hooked portion 37 from engagement with the flange 38. The cover 18 is then removed by lifting the lower end and then withdrawing the hook-shaped projections 30 from engagement with the rim 33.

To ensure close fitting of the cover, it can be given a slight curvature. Thus, looking at the cover 18 edgewise, that is in the direction of arrow Y in FIG. 1, the cover comprises a substantially planar portion 42 and top and bottom flanges or webs 43 and 44. The portion 42 is slightly curved, being concave relative to its outer surface. This provides some resilience, ensuring contact between the cover 18 and the top housing 12. Also, the resilience provides for some variation in the lengths of the projections 30 and 34 and other variations, due to slight mold inaccuracies.

It will be seen that the removeable cover 18 is very easily and quickly installed and yet is easily and quickly removed. While in position it is firmly fixed, a very important feature. Users often pick up telephone sets and it is most essential that however the set is picked up the cover stays in position. The cover is not removable unless the correct type of instrument is used to push the flexible projection 34 out of engagement with the top housing. Either a small diameter probe or similar tool is necessary. The hole 41 is inconspicuous and not obvious in its purpose and therefore undesired removal of the cover 18 is not likely to occur. Also, the particular unit illustrated and described can be mounted as a wall unit —which prevents access to any screws used to secure the interior item and which are entered from the back or base of the unit. By using a readily removeable cover, attachment screws can be applied from the front and then covered over.

Depending upon the type of dial so the cover 18 is selected. It is easier and cheaper to stock varying forms of cover 18 than varying forms of an entire top housing to cater for dial variations, and other possible variations. It is also possible to provide covers for special locations, for example, which embody second features, such as diagrams, notes, pictures and the like. For example some telephone sets may be provided with additional service facilities —the circuitry of which is housed in the telephone set. It is still possible to use common top and base housings, only a different form of cover being supplied.

The colour of the cover 18 can vary providing the ability to give a colour choice.

It is also possible to provide the cover with a textured surface. Texturing of the surface of a part of a telephone unit would often be desirable, but in conventional units texturing is uneconomic. This is because outer covers, or casings, of units are often refurbished such as by burnishing or buffing or by painting. A textured surface is not readily amenable to such refurbishing. By providing a relatively cheap cover, texturing can be used as it is cheaper to discard an old cover than refurbish it.

While the removeable cover 18 is illustrated as extending for only part of the width of the top housing, it is possible to have the removeable cover extend over the entire top housing if desired. In such an arrangement, local apertures can be formed in the cover the dial 14 and for alignment with the recesses 15 in the top housing. As an alternative the recesses could be formed in the cover. With a cover extending for the entire top housing it is possible to provide one or more large apertures in the housing for access to the interior of the telephone set.

It is also possible to use a removeable cover in conjunction with other forms of telephone sets. Further, the particular forms of base housing 11 and top housing 12 can be varied. For example the top housing 12 can be shallower and the base housing 11 deeper. In such a construction it is possible to have the apertures through which the projections 30 and 34 extend formed in the base housing. In such an arrangement the surfaces with which the projections engage can be on the base housing also.

It is also likely that damage, such as scratching, and discolouration of the cover will occur in the vicinity of the dial, and pushbuttons. It is quick and economical to change the cover 18 rather than the entire top housing. Even if the cover covers the top housing entirely, replacement of the cover in the event of damage or wear is cheaper than replacing a top housing.

The construction is rigid and is not liable to distortion when the telephone set is handled. The top housing, being box shaped, is very rigid. The cover, although somewhat more flexible, is held firmly in contact with the top housing by the projections 30 and 34 and once in position is prevented from distortion by the support afforded by the top housing.

Thus the invention provides a removeable cover which is quickly and easily removed and replaced; is held firmly in position and will not become displaced during handling of the telephone set; provides an economical way of accommodating alternative forms of dial and an economical way of catering for differing services which may be provided; is cheaper to replace in the event of damage or wear; and provides an economic way of giving colour variations. There is a considerable reduction in the quantity of stock which must be held. It will be seen that a cover is cheaper, lighter and smaller than a top housing. Therefore the volume of storage required is considerably reduced. The capital tied up in stock is also reduced. Normally only one type of housing need be made and stocked, providing considerable savings. Service engineers need not carry a large number of housings to cater for colour or other variations -perhaps only normally carrying one or two and meeting colour and style and other variations with the differing forms of cover.

What is claimed is:

1. A telephone set comprising:

a base housing and a top housing;

apertures in said top housing for reception of items of the telephone set, one of said apertures adapted to receive either a pushbutton dial or a rotary dial without modification to said top housing;

a removable cover in close fit on said top housing, said cover having different configurations in accordance with the type of dial employed;

apertures in said removable cover for reception of said items of the telephone set, one of said apertures adapted to provide a close fit around said pushbutton dial in a first cover configuration and adapted to provide a close fit around said rotary dial in a second cover configuration, the arrangement such that the set is capable of accepting either type of dial and the cover specific to the type of dial;

projections on one edge of said cover;

further apertures in one of said base housing and said top housing for passage of said projections therethrough;

at least one surface adjacent said further apertures and engaged by said projections;

a resilient projection on an edge of said cover opposed to said one edge;

an opening in one of said base housing and said top housing for passage of said resilient projection therethrough;

a further surface adjacent said opening and engaged by said resilient projection;

an extension on said resilient projection;

a hole in one of said base housing and said top housing aligned with said extension for reception of a probe whereby a probe can engage said extension and flex said projection out of engagement with said surface.

2. A telephone set as claimed in claim 1, said cover extending over part of the top housing; and a recessed portion on said top housing, said cover positioned on said recessed portion.

3. A telephone set as claimed in claim 1, said cover comprising a substantially planar main portion and top and bottom flanges, said projections on one edge of the cover extending inwardly and downwardly from said top flange and said resilient projection extending inwardly and downwardly from said bottom flange, said further apertures and said opening formed in said base housing.

4. A telephone set as claimed in claim 3, said main portion of said cover of slight concave curvature in a plane extending through said top and bottom flanges.

* * * * *